(12) United States Patent
Nilvius et al.

(10) Patent No.: US 12,365,290 B2
(45) Date of Patent: Jul. 22, 2025

(54) TIGHTENING MEMBER, CLAMP MEMBER AND CLAMP ASSEMBLY

(71) Applicant: Thule Sweden AB, Hillerstorp (SE)

(72) Inventors: Anders Nilvius, Värnamo (SE); Johan Rinman, Värnamo (SE); Mathias Giselson, Värnamo (SE)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 18/563,343

(22) PCT Filed: May 17, 2022

(86) PCT No.: PCT/EP2022/063291
§ 371 (c)(1),
(2) Date: Nov. 21, 2023

(87) PCT Pub. No.: WO2022/248286
PCT Pub. Date: Dec. 1, 2022

(65) Prior Publication Data
US 2024/0217445 A1     Jul. 4, 2024

(30) Foreign Application Priority Data

May 27, 2021 (EP) .................................... 21176358

(51) Int. Cl.
*B60R 9/04* (2006.01)
*B60R 9/048* (2006.01)
(Continued)

(52) U.S. Cl.
CPC ............... *B60R 9/048* (2013.01); *F16B 2/10* (2013.01); *F16B 2/14* (2013.01)

(58) Field of Classification Search
CPC ............... B60R 9/048; F16B 2/10; F16B 2/14
(Continued)

(56) References Cited

U.S. PATENT DOCUMENTS 5,826,785 A * 10/1998 Belvederi .......... B65D 85/1081
229/160.1
5,913,465 A * 6/1999 Potter .................... B60R 9/058
224/326
(Continued)

FOREIGN PATENT DOCUMENTS

DE          819828 C     11/1951
WO     2010088971 A1      8/2010
(Continued)

OTHER PUBLICATIONS

International Search Report and Written Opinion for PCT/EP2022/063291, mailed on Sep. 2, 2022, 23 pages.
(Continued)

*Primary Examiner* — Todd M Epps
(74) *Attorney, Agent, or Firm* — Sterne, Kessler, Goldstein & Fox P.L.L.C.

(57) ABSTRACT

Disclosed is a tightening member for tightening a clamping device for fixing an accessory to a crossbar of a load carrier. The tightening member includes a coupling portion for detachably coupling the tightening member to a coupling section of the clamping device. The coupling portion is engageable with the coupling section in a torque transferable manner. The tightening member comprises an operating portion configured to be grasped and rotated by a user, and the operating portion is operatively coupled to the coupling portion. The coupling portion includes an accommodating portion for at least partially receiving a force receiving portion of the coupling section therein.

9 Claims, 7 Drawing Sheets

(51) Int. Cl.
*F16B 2/10* (2006.01)
*F16B 2/14* (2006.01)

(58) Field of Classification Search
USPC .......................................... 224/321; 248/544
See application file for complete search history.

(56) References Cited

U.S. PATENT DOCUMENTS

| | | | |
|---|---|---|---|
| 6,070,774 A * | 6/2000 | Rak .................. | B60R 9/045 |
| | | | 411/7 |
| 2004/0089106 A1 | 5/2004 | Wolfe et al. | |
| 2008/0034561 A1* | 2/2008 | Emmerling ............ | B60R 9/055 |
| | | | 24/514 |
| 2015/0367487 A1 | 12/2015 | Nino et al. | |
| 2020/0376631 A1* | 12/2020 | D'Angelo ............... | B25B 5/106 |

FOREIGN PATENT DOCUMENTS

| WO | 2014164293 A2 | 10/2014 |
|---|---|---|
| WO | 2016208265 A1 | 12/2016 |
| WO | 2018186466 A1 | 10/2018 |

OTHER PUBLICATIONS

European Search Report and Written Opinion for EP 23169531.3, mailed on Jun. 12, 2023, 10 pages.

* cited by examiner

TIGHTENING MEMBER, CLAMP MEMBER AND CLAMP ASSEMBLY

FIELD OF THE INVENTION

The present invention relates to a tightening member, a clamp member, and a clamp assembly.

BACKGROUND

Tightening members used for different purposes in connection with vehicle accessories are known from the prior art. For example, tightening members are used for tightening different members or units of load carrying equipment to a supporting structure. It is known to use specific tightening members for attaching accessories to crossbars of a load carrier system, for example a load carrier system in which the crossbars are mounted on the roof of a vehicle. Accessories may include roof boxes or other objects to be fixed on the crossbars such as roof tents.

One drawback of known tightening members is that they are often provided integrally with a member to be operated by the same. For example, it is known to use tightening members for operating clamp mechanisms of a roof box system. The tightening members are an integral part of such clamp mechanisms and remain on the clamp mechanisms even if the tightening process is completed. Accordingly, such tightening members take up room within a roof box which is then not available for stowing goods to be transported. Furthermore, such tightening members are exposed and therefore prone to damages which may result from forces acting on the tightening member applied on the same by a good transported within the roof box, for example during abrupt deceleration.

Another drawback of known tightening members is that the use of the same is often cumbersome. For example, if such a tightening member is used for mounting an accessory on the crossbar, situations occur in which a clamp for mounting the accessory, such as a roof tent, needs to be mounted to the crossbar by use of a bracket enclosing a lower portion of the crossbars. Such a bracket needs to be tightened and mounted from below. A space between crossbars mounted on the roof of a vehicle and an upper surface of the roof of the vehicle is, however, very limited. Therefore, it is difficult for a user to carry out a tightening action in such limited space.

A further drawback resides in the fact that tightening members are often used at positions that are not visible to a user. Accordingly, in such situations, the user has to carefully approach the member to be tightened and to couple the tightening member to the member to be tightened without having eyes on the position. Coupling the tightening member to the member to be tightened may thus be very cumbersome for the user and may include situations in which the user abuts portions other than the portion to which it is to be coupled. This may lead to damages on the tightening member and/or on portions of the accessory.

SUMMARY

In order to overcome at least one of the above drawbacks, the tightening member may be configured detachable. In order to overcome at least one of the above drawbacks, the tightening member may be configured very compact in size. Furthermore, in order to overcome another of the above drawbacks, the tightening member may be configured to guide the user holding the tightening member towards a coupling position. Furthermore, a clamping device may be provided which allows for an improved coupling of a tightening member to the same.

It is the object of the invention to provide an improved tightening member, clamping device and clamping assembly.

The object is solved by a tightening member, a clamping device, and a clamping assembly according to embodiments of the present disclosure.

According to a first aspect, a tightening member for tightening a clamping device for fixing an accessory to a crossbar is disclosed. The tightening member may comprise a knob like shape or may comprise the shape of a wrench tool, for instance. The accessory may be implemented by a load carrier, for example a roof box, or may be implemented by other systems to be supported on a load carrier frame such as crossbars, for example a roof tent.

In an embodiment according to the first aspect, the tightening member may comprise a coupling portion for detachably coupling the tightening member to a coupling section of a clamping device. The coupling portion can be configured engageable with the coupling section in a torque transferable manner.

The tightening member may further comprise an operating portion configured to be grasped and rotated by a user. The operating portion may be operatively coupled to the coupling portion. Accordingly, when a user grasps the operating portion and rotates the same, a rotation of the operating portion may be transferred to the coupling portion. In particular, a rotation of the operating portion may be transferred into a rotation of the coupling portion. The operating portion may be operatively coupled to the coupling portion such that a rotation of the operating portion is directly transferred into a rotation of the coupling portion.

According to an embodiment, the coupling portion comprises an accommodating portion for at least partially receiving a force receiving portion, for example a protrusion, of the coupling section therein. The accommodating portion can be configured as a recess or may comprise a recess according to some embodiments. The accommodating portion can alternatively be configured as an opening or may comprise an opening in some embodiments. For example, the accommodating portion can comprise a through opening extending through the entire coupling portion.

According to an embodiment, the tightening member further comprises a securing mechanism. The securing mechanism may be configured for temporarily fixedly coupling the coupling portion to the coupling section such that the tightening member is prevented from coming off of the coupling section.

According to an embodiment, the securing mechanism is configured to establish a releasable positive coupling. For that, the securing mechanism may comprise at least one engaging portion which is engageable with an engaging section provided in the coupling section. The engaging section provided in the coupling section may be a groove, for example an annular groove.

According to an embodiment, the engaging portion comprises a resilient engaging member. The resilient engaging member can comprise a hook like protrusion. The hook like protrusion can comprise a barb. The resilient engaging member may be configured to automatically establish locking with the coupling section. In particular, the resilient engaging member may be configured to snap into the engaging section, for example upon inserting the tightening member on the force receiving portion, for example the protrusion.

According to an embodiment, the securing mechanism comprises a release mechanism for releasing an established fixed coupling between the coupling portion and the coupling section. The release mechanism can comprise an operating portion. The operating portion may be configured such that upon operation of the same by a user, it releases the established fixed coupling to allow a detachment of the tightening member from the clamping device. The operating portion may be a pushbutton or a pulling member, for instance.

According to an embodiment, the securing mechanism comprises a magnet for generating an attraction force towards the coupling section.

According to a further embodiment, the tightening member may in addition or alternatively comprise a torque limiting mechanism operatively coupling the coupling portion with the operating portion.

According to an embodiment, the torque limiting mechanism comprises a first toothed portion operatively coupled to the operating portion and the second toothed portion operatively coupled to the coupling portion. Furthermore, the torque limiting mechanism may comprise an urging member for urging the first toothed portion and the second toothed portion towards each other with a predetermined urging force. The predetermined urging force and a configuration of the first and second toothed portions may define a maximum transferable torque.

According to an embodiment, the tightening member may comprise a ratchet mechanism. The ratchet mechanism may be a one-way ratchet mechanism and may be configured to allow a pumping-like tightening operation by providing a one-way torque transmission. In other words, the ratchet mechanism comprises a one way torque transmitting capability. The direction of the torque transmitting capability may be reversable. For that, a reversing mechanism may be provided.

The ratchet mechanism may be configured similar to the above mentioned torque limiting mechanism, in other words with toothed portions normally forcedly engaged with each other by application of an urging force by an urging member. The tooth geometry is, however, different in order to provide maximum force transmission in one direction and to provide substantially no force transmission in opposite rotation direction. In an embodiment, a single urging member may be provided which acts in both the torque limiting mechanism and the ratchet mechanism.

According to an embodiment, the torque limiting mechanism and the ratchet mechanism may be provided in this order in a force transfer path from the operating portion to the accommodating portion. In this way, the ratchet mechanism may only transfer an already limited maximum torque to the accommodating portion, as received from and limited by the torque limiting mechanism.

The ratchet mechanism may comprise a third toothed portion and a fourth toothed portion. The third toothed portion and the fourth toothed portion are configured to provide a freewheel like configuration in which a rotational force may only be transferred in one direction. The third toothed portion may be operatively coupled to the operating portion and the fourth toothed portion may be operatively coupled to the coupling portion. Furthermore, an urging member, for example a disc spring or a wave spring, may be provided for urging the third toothed portion and the fourth toothed portion towards each other. The third and fourth toothed portions may comprise a tooth configuration such that in tightening direction, teeth of the driving toothed portion lock with teeth of the driven toothed portion, and in the other direction teeth of the driving toothed portion slip over teeth of the driven toothed portion.

The torque limiting mechanism and the ratchet mechanism may be configured to share certain members and/or portions, for example the urging member and/or at least one force transfer member, for example an annular force transfer member, carrying toothed portions on opposite sides, wherein one of the toothed portions is associated with the ratchet mechanism and the other toothed portion is associated with the torque limiting mechanism.

The torque limiting mechanism and the ratchet mechanism may be provided by a single pair of toothed portions, for example in the first toothed portion and the second toothed portion or in the third toothed portion and the fourth toothed portion as mentioned above. Each toothed portion of the pair of toothed portions may comprise dual-action teeth allowing to transfer torque up to a predetermined first threshold limit in tightening direction and allowing slipping between the toothed portions in opposite rotating direction. In addition or alternatively, at least one toothed portion may be provided on a disc member prebiased towards engagement with the other toothed portion, for example by an urging member as described before. In addition or alternatively, at least the torque limiting mechanism and the ratchet mechanism may be fully accommodated in a common cylindrical housing portion. In addition or alternatively, the toothed portion of the torque transfer mechanism and/or of the ratchet mechanism, which is last in said force transfer path between the operating portion and the coupling portion, may be provided on a force transfer member having, on an opposite side to a side on which the toothed portion is provided, a force transfer portion engaged with the coupling portion such that a rotational force is transferable to the coupling portion while the force transfer member is held axially movable relative to the coupling portion.

According to an embodiment, the tightening member comprises a torque-limiting-free coupling portion. Such a coupling portion may be provided for untightening purposes or other situations in which a limitation of the transferable torque is undesired.

According to a second aspect, a clamping device for fixing an accessory to a crossbar is provided. The clamping device is configured to be operated by a detachable tightening member, for example a tightening member as described before in connection with the first aspect.

The clamping device comprises a base portion configured to be supported on an accessory to be mounted on the crossbar.

The clamping device further comprises at least one movable clamping member which is movable with respect to the base portion between a clamping position in which the clamping member at least partially embraces the lower portion of the crossbar and an opened position in which the clamping device is insertable on or removable from the crossbar. The movable clamping member may be a pivotable clamping member. Furthermore, in the clamping position, the clamping member may be configured to apply a clamping force on the lower portion of the crossbar.

The clamping device further comprises a rotatable force receiving portion operatively coupled to the at least one movable clamping member such that a rotation of the rotatable force receiving portion is transferred into a movement of the movable clamping member. Furthermore, the rotatable force receiving portion is configured to be to detachably couplable to a coupling portion of a tightening member in a torque transferable manner.

The rotatable force receiving portion at least comprises a torque transmitting profile defined by a wall portion. The wall portion at least partially extends about an axis of rotation of the force receiving portion. The torque transmitting profile may be provided on a radially outer surface of the wall portion.

According to an embodiment, the wall portion comprises an engaging section on a radially inner surface. The engaging section may preferably comprise a recess at least partially extending about the axis of rotation.

According to an embodiment, the coupling section is integrally formed with a tightening bolt and/or the coupling section is made of metal.

According to an embodiment, the base portion comprises an opening. The opening may be a circular opening. The force receiving portion can be received in the opening such that its radially outer surface is arranged at a distance from a wall defining the opening such that a receiving space is provided between the wall and the outer surface. The receiving space may be configured for receiving an edge portion of the coupling portion of a tightening member.

According to an embodiment, the clamping device further comprises a supporting surface for slidably supporting a lower supporting surface of the tightening member. The supporting surface may extend in a direction perpendicular to the axis of rotation of the coupling section. According to an embodiment, the coupling section comprises a hexalobular or Torx profile.

According to a further aspect, a clamping assembly comprising at least one tightening member as described above and at least one clamping device as described above in combination, is disclosed. The tightening member may be releasably attachable to the clamping device for tightening and releasing purposes and may be stowable in a detached state in a space-saving manner.

According to a further aspect, a tightening member for tightening a clamping device for fixing an accessory to a crossbar may be provided. The tightening member may comprise a coupling portion for detachably coupling the tightening member to a coupling section of the clamping device. The coupling portion may be configured engageable with the coupling section in a torque transferable manner. The tightening member may further comprise an operating portion configured to be grasped and rotated by a user. The operating portion may be operatively coupled to the coupling portion.

The coupling portion may be configured with an accommodating portion for at least partially fixedly receiving a force transmitting member detachably couplable to the clamping device or may comprise a force transmitting portion provided as a protrusion detachably insertable into the clamping member for tightening purposes. The protrusion may comprise an engaging profile on its outer circumference.

Accordingly, a tightening member with a protruding coupling portion may be provided. The protruding coupling portion may be configured to be received in a force receiving section of a clamping member.

As described before with respect to the other aspects and embodiments, also this tightening member may comprise a securing mechanism for temporarily fixedly coupling the coupling portion to the coupling section such that the tightening member is prevented from coming off of the coupling section.

The securing mechanism may be configured to establish the releasable positive coupling by comprising at least one engaging portion engageable with an engaging section provided in the coupling section, for example a groove provided in the force receiving portion. The securing mechanism may be configured identical to the already described securing mechanism as disclosed in connection with the other aspects and embodiments.

The tightening member according of this further aspect may furthermore comprise a torque limiting mechanism configured as described before with respect to the other aspects and embodiments. The tightening member may in addition or alternatively comprise a ratchet mechanism as described before in connection with other aspects and embodiments.

Furthermore, the tightening member according to this further aspect may comprise a lower supporting surface to be supported on a supporting surface of a clamping device. The lower supporting surface may be provided as an annular surface surrounding the coupling portion.

Additional features and advantages may be gleaned by the person skilled in the art from the following description of exemplary embodiments, and the attached drawings.

BRIEF DESCRIPTION OF THE DRAWINGS

The accompanying drawings, which are incorporated herein and form part of the specification, illustrate embodiments and, together with the description, further serve to explain the principles of the embodiments and to enable a person skilled in the art to make and use the embodiments.

The features and advantages of the embodiments will become more apparent from the detailed description as given below when taken in conjunction with the drawings, in which like reference signs identify corresponding elements throughout. In the drawings like reference numbers generally indicate identical, functionally similar and/or structurally similar elements.

DETAILED DESCRIPTION OF EMBODIMENTS

Embodiments and modifications will be described in the following with reference to the drawings.

Figure 1:
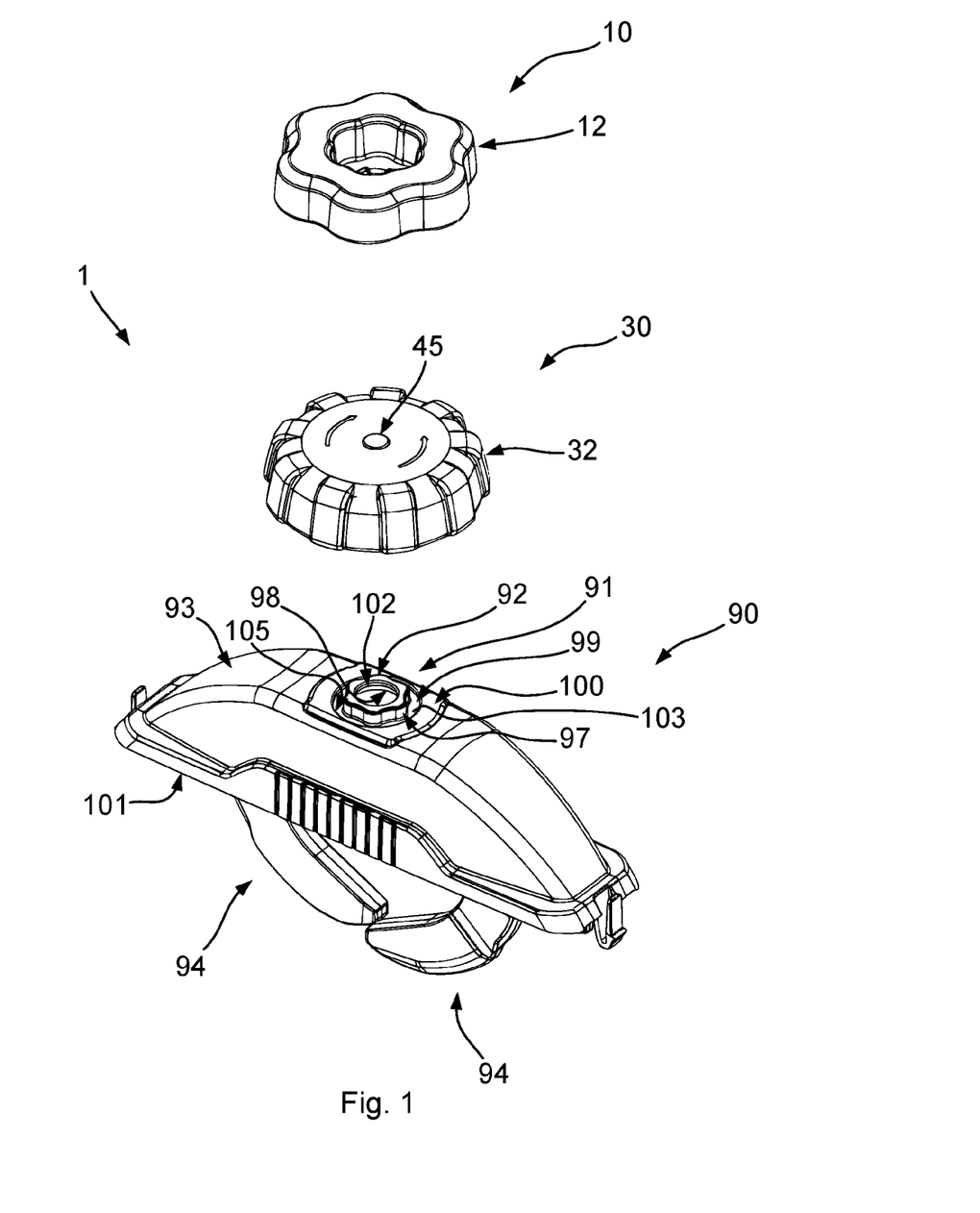
FIG. 1 shows a perspective view of a clamping assembly according to an embodiment.
Figure 5:
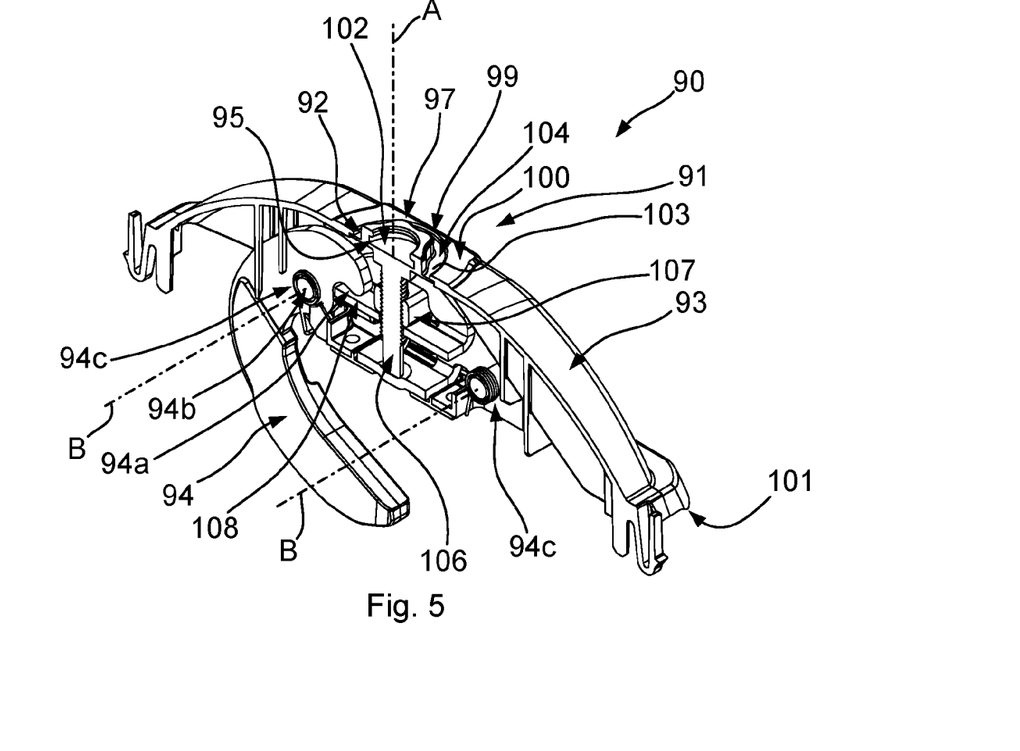
FIG. 5 shows a sectional perspective view of a clamping device according to an embodiment.

FIG. 1 shows a perspective view of a clamping assembly 1 according to an embodiment. The clamping assembly 1 comprises a clamping device 90 according to an embodiment. A sectional view of the clamping device 90 revealing optional additional features of the clamping device 90, is shown in FIG. 5.

The clamping device 90 comprises two clamping members 94. It is noted that the clamping device 90 may comprise a different number of clamping members. According to a modification, the clamping device 90 comprises only a single clamping member. Each clamping member 94 is held movable between a clamping position in which the clamping member 94 can embrace a lower portion of a crossbar and an opened position in which the clamping device 90 is insertable on or removable from the crossbar. For that, each clamping member 94 is movably mounted on a base portion 93 of the clamping device 90. With such a configuration, at least a free end portion of each clamping member 94 is movable towards and away from a supporting plane which is defined by a lower supporting surface 101 provided on a lower portion of the base portion 93. In use, a crossbar may be clamped between each clamping member, for example a free end portion of the clamping member 94, and a portion of the lower supporting surface 101. In FIG. 1, the clamping device 90 is shown in a state in which the clamping members 90 are positioned in the clamping position.

The clamping device 90 comprises a coupling section 91. The coupling section 91 comprises a force receiving portion 92 which is rotatable about a rotation axis A. The rotation axis A may extend perpendicular to a plane in which a rotation axis B of a clamping member 94 extends. For example, the rotation axis A may extend skew to the rotation axis B so that both axes extend at an angle of 90 degrees and offset with respect to each other. The force receiving portion 92 is operatively coupled to each movable clamping member 94. Accordingly, a rotation of the force receiving portion 92 is transferred into a rotating movement of each clamping member 94. It is noted that according to a modification, a movable clamping member may be provided which is translatory movable. In such a configuration, the force receiving portion 92 is operatively coupled to each clamping member 94 such that a rotational movement of the force receiving portion is transferred into a translatory movement of the clamping member.

In the embodiment, the force receiving portion 92 may be coupled to or may be integrally formed with a threaded rod 106. The threaded rod 106 is held in the base portion 93 rotatably about the rotation axis A but stationary fixed in a longitudinal extension direction of the threaded rod 106. In other words, the threaded rod 106 cannot be moved other than in a rotating manner. A force transfer member 107 is threadedly engaged with the threaded rod 106 such that a rotation of the threaded rod 106 leads to a displacement of the force transfer member 107 along the rotation axis A. The force transfer member 107 comprises a contact portion 108 configured to contact a force receiving portion 94a of the clamping member 94 and to apply a force on the clamping member 94 moving the same towards a closed position. The clamping member 94 is pivotably held on the base portion 93 by means of a pivot pin 94b. An urging member 94c is provided for urging the clamping member 94 towards the opened position. Accordingly, displacing the force transfer member along the rotation axis A moves the clamping member 94 between the open position and the closed position.

The force receiving portion 92 comprises a profile that allows to detachably couple a tightening member thereto. In particular, the force receiving portion 92 and the tightening member can be configured to be coupled to each other in a shaft and hub connection like manner.

According to the embodiment as shown in FIGS. 1 and 5, the force receiving portion 92 is configured as a protrusion. The force receiving portion 92 comprises a cylindrical portion. In the embodiment, the cylindrical portion is a hollow cylindrical portion with an inner space 102. However, modifications in which the cylindrical portion is a solid cylinder are also possible.

According to the embodiment of FIGS. 1 and 5, the cylindrical portion comprises a non-round outer profile defined by a radially outer surface 97 and a circular inner profile defined by a radially inner surface 98. According to a modification, an inverse arrangement is also possible. The non-round outer profile may comprise a polygonal shape or may comprise a hexalobular or Torx profile as shown in FIG. 1. Accordingly, the force receiving portion 92 may be defined as a sleeve portion with a radially inner surface and a radially outer surface. In the embodiment as shown in FIGS. 1 and 5, an engaging section 95 is provided on the force receiving portion 92. The engaging section 95 provides a portion for a positive connection with the force receiving portion. In the embodiment, the engaging section 95 comprises a recess which is formed in the radially inner surface of the force receiving portion 92. The recess may be configured to fully extend about the rotation axis of the force receiving portion 92. Hence, in the embodiment, the recess is an annular recess provided in the inner surface of the force receiving portion 92. Instead of a continuous recess extending fully about the rotation axis, one or more recesses may be provided on the radially inner surface.

The force receiving portion 92 is rotatably accommodated in an opening 99 defined in the base portion 93. According to the embodiment, the force receiving portion 92 is arranged such that its radially outer surface is supported at a distance from an inner wall 105 or surface of the opening 99. For that, the force receiving portion 92 may be supported on the base portion via a flange portion 103 protruding radially outward from the outer surface of the receiving portion 92 and slidably accommodated in a recess provided on the base portion 93. In this way, a space 104 is provided between the outer surface of the force receiving portion 92 and the inner wall 105. This space 104 is suitable for receiving a guiding portion, for example an edge portion 21, 41, 61 of a coupling portion 11, 31, 51 of a tightening member 10, 30, 50. The edge portion of the coupling portion may be slidingly supported on the inner wall 105 thereby providing a correct positioning of a tightening member about the rotational axis of the force receiving portion 92. Such a configuration supports the tightening member in radial direction and therefore prevents a transfer of forces in radial direction on the force receiving portion.

The coupling section 91 further comprises an upper supporting surface 100. The upper supporting surface 100 may be integrally formed with the base portion 93. The upper supporting surface 100 may extend in a plane which is perpendicular to the rotation axis A of the force receiving portion 92. The supporting surface 100 may serve as a sliding surface for supporting a tightening member detachably couplable to the coupling section 91. Such a configuration provides increased stability of the tightening member due to an increased supporting surface on the clamping device. Furthermore, the supporting surface 100 prevents an application of a bending moment on the coupling section 91 as it secures a correct position of the tightening member on the coupling section. In this way, only a rotational force is transferred from the tightening member to the coupling section and tilting of the tightening member with respect to the rotational axis A of the force receiving portion 92 is prevented.

The clamping device 90 is operable by a suitable tightening member. Different tightening members 10, 30, 50, 70 are available for such purpose.

In FIG. 1, two possible configurations of tightening members 10, 30 are shown. Further features of these tightening members 10, 30 and their possible configurations will be described in greater detail with reference to FIGS. 2 and 3. Further tightening members for operating the clamping device 90 will be described later with reference to FIGS. 4 and 7 to 9. A possible application of the clamping assembly 1 will also be described later with reference to FIG. 6.

Figure 2:
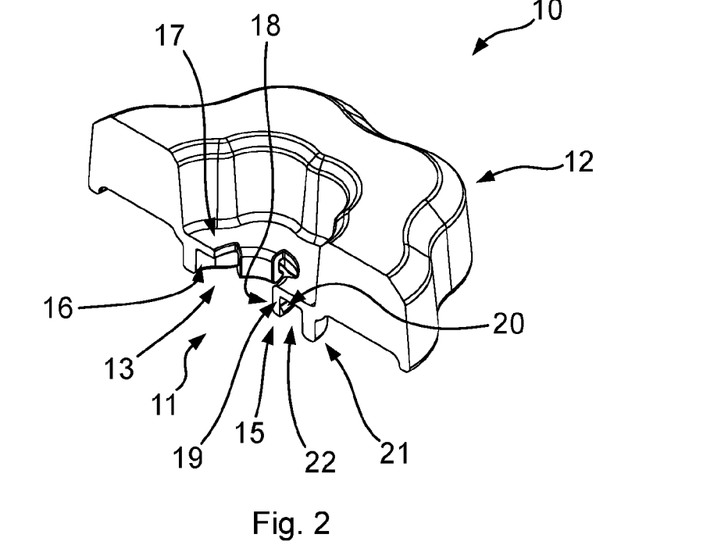
FIG. 2 shows a sectional perspective view of a tightening member according to an embodiment.

A first embodiment of a tightening member 10 is shown in FIGS. 1 and 2. The tightening member 10 is a knob graspable by a user and detachably mountable to the above mentioned coupling section 91 of the clamping device 90. The tightening member 10 comprises a coupling portion 11. The coupling portion 11 is adapted to the configuration of the coupling section 91 to which it is detachably mountable. The tightening member 10 comprises an operating portion 12 graspable by a user. In the embodiment, the operating portion 12 and the coupling portion 11 may be integrally formed, for example from plastics material. The operating portion 12 is provided on an outer circumferential surface of the tightening member 10. An outer circumferential diameter of the tightening member is larger than a dimension of the tightening member in axial extension direction. This renders the tightening member flat and disc-like. The coupling portion 11 comprises an accommodating member in the form of a recess 13 for receiving a force receiving portion 92 of a clamping device 90. The recess 13 is defined by an inner surface 16 which is shaped corresponding to an outer wall or radially outer surface 97 of the force receiving portion 92. The inner surface 16 may define a cylindrical shape or a conical shape. In other words, the inner surface 16 may define a lateral surface of the recess 13. The cross section of the inner surface 16 is configured non-round. In the embodiment, a profile provided by the inner surface 16 is hexalobular and, thus, suitable for transferring a rotational force to the force receiving portion 92. On the other hand, the inner surface 16 is configured so as to allow an insertion and detachment of the tightening member 10 on the receiving portion 92 in axial direction.

The above features would already be enough to provide a suitable tightening member for operating the clamp mechanism 90. Therefore, according to an embodiment, a tightening member with a recess 13 configured matingly with the receiving portion 92 and configured detachably couplable to the receiving portion is provided. In the embodiment, however, optional further features are shown which may be provided in addition. For example, the tightening member 10 may comprise an engaging portion 15 which is configured to engage with a mating engaging section 95 of a force receiving portion 92. The engaging portion 15 comprises a resilient engaging member 18 in the form of a hook like protrusion 19. The protrusion extends from a base portion 17 limiting the recess 13 in axial direction. The base portion 17 may also be referred to as bottom portion of the recess 13.

A receiving space 22 is formed between the protrusion and the inner surface 16. On a free end portion of the protrusion 19, a projection 20 projecting in radial direction towards the inner surface 16 is provided. The projection 20 is configured to engage with an engaging section 95 provided on the force receiving portion 92 of a clamping device 90, for example a clamping device 90 as described before. The resilient engaging member 18 may be configured to snap into the engaging section 95 upon inserting the tightening member 10 on the clamping device 90. In this way, a positive coupling is established between the tightening member 10 and the clamping device 90 which may prevent or at least make it more difficult for the tightening member to come off of the force receiving portion 92 during a tightening action. The tightening member 10 may further comprise an edge portion 21 configured to be received in the above-mentioned receiving space 104 defined between the inner wall 105 and the force receiving portion 92.

Figure 3:
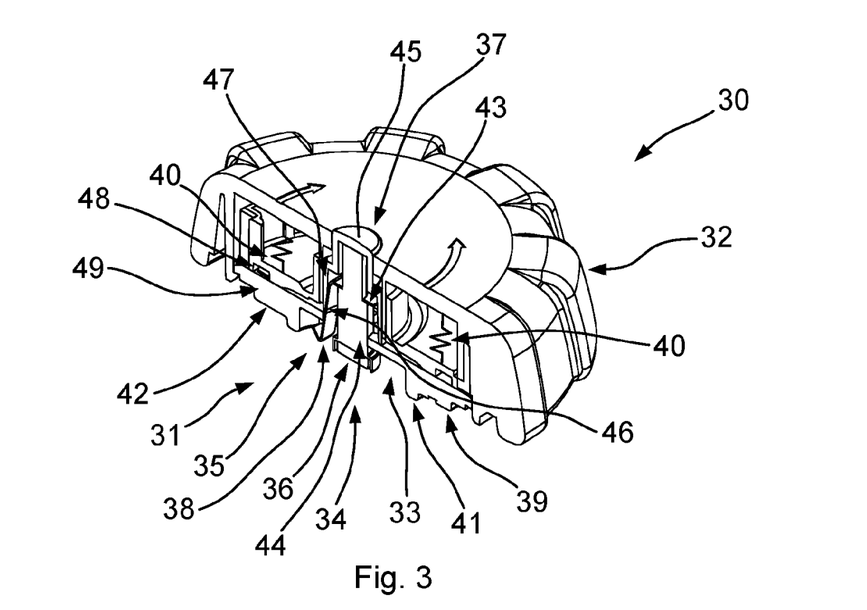
FIG. 3 shows a sectional perspective view of a tightening member according to a further embodiment.

A second embodiment of a tightening member is shown in FIGS. 1 and 3 and will be described with reference to these drawings in the following. The tightening member 30 is again a knob graspable by a user and detachably mountable to the above mentioned coupling section 91 of the clamping device 90. The tightening member 30 comprises a coupling portion 31. Similar as in the tightening member 10 according to the first embodiment, the coupling portion 31 is adapted to the configuration of the coupling section 91 to which it is detachably mountable.

The tightening member 30 comprises an operating portion 32 graspable by a user. The operating portion 32 is provided by an outer circumferential surface of the tightening member 30. The coupling portion 31 comprises a recess 33 for receiving a force receiving portion 92 of a clamping device 90.

The tightening member 30 also comprises a securing mechanism 34 for temporarily fixedly coupling the coupling portion 31 to the coupling section 91 such that the tightening member is prevented from coming off of the coupling section 91. A difference compared to the coupling portion 11 of the tightening member 10 according to the first embodiment is that the securing mechanism 34 is configured to be releasable only by way of an active deactivation of the same by a user.

The securing mechanism 34 comprises an engaging portion 35 which is configured to engage with a mating engaging section 95 of a force receiving portion 92. The engaging portion 35 comprises one or more resilient engaging members 38 that may be in the form of a hook-like protrusion such as a barb. The one or more engaging members 38, for example protrusions, may extend from a base portion 43 which is received on a support portion 44. The base portion 43 and the one or more resilient engaging members 38 are integrally formed, for example from a bent sheet metal. The one or more resilient engaging members 38 comprise a flexing section 46 extending along the support portion 44 and along a middle axis of the tightening member 30. At a free end of each flexing section 46, an engaging portion is formed. The engaging portion may be formed by bending a free end portion of the flexing section 46 such that an angle of 90 degrees or less is formed between the bent portion and an adjacent portion of the flexing section 46. In the embodiment, the bent portion and the adjacent portion form a V-shape. The engaging portion may therefore also be referred to as barb.

The flexing section 46 may be arranged such that the same extends at an angle with respect to the guiding portion and/or middle axis in an unloaded condition. Accordingly, in a state in which no load is applied on the flexing section, the engaging portion is positioned radially offset from the support portion 44 and the middle axis of the tightening member 30. Due to its resilient nature, the flexing section 46 tends to move the engaging portion towards this unloaded position.

A release mechanism 37 is provided and configured to move each engaging portion radially inwardly upon operating the same. Accordingly, the release mechanism 37 may be configured to elastically bend the flexing sections 46 for radially displacing each engaging portion inwardly towards the middle axis of the tightening member 30. In the embodiment, the release mechanism 37 is provided for such purpose. The release mechanism 37 is configured for releasing a locking which is established by the resilient engaging member 38 when the tightening member 30 is inserted on a clamping device. The release mechanism 37 comprises an operating portion 45. The operating portion 45 is configured as a push button. An engagement is releasable by pushing the operating portion 45.

The support portion 44 slidably supports the operating portion 45 of the release mechanism 37 for releasing a locking established by the resilient engaging member 38 when the tightening member 30 is inserted on a clamping device. The operating portion 45 comprises a sleeve portion 47. The base portion 43 and at least a portion of the flexing section 46 are accommodatable in the sleeve portion 47 by moving the sleeve portion in axial direction. The inner diameter of the sleeve portion 47 is smaller than a radial outer dimension of the flexing sections 46 so that moving the sleeve portion 47 on the flexing sections 46 along the middle axis results in a bending movement of the same and, thus, to a radially inward movement of their free end portions comprising the engaging portions. Accordingly, a mechanism is provided in which a translatory movement of the operating portion 45 along the middle axis is transferred into a movement of the engaging portions in radial direction for disengaging the engaging portions.

A further difference is that the tightening member 30 according to the second embodiment may in addition or alternatively comprise a torque limiting mechanism 39. The torque limiting mechanism 39 is provided in a force transfer path between the operating portion 32 and the coupling portion 31. Accordingly, the torque transferable from the operating portion 32 to the coupling portion 31 is limited to a predetermined torque.

The torque limiting mechanism 39 comprises a first toothed portion 48 operatively coupled to the operating portion 32 and a second toothed portion 49 operatively coupled to the coupling portion 31. In the embodiment, the first toothed portion 48 and the second toothed portion 49 are provided on disc like portions. The second toothed portion 49 may be integrally formed with other portions or elements of the coupling portion 31. The coupling portion 31 with the second toothed portion 49 is accommodated and held in the operating portion 32 such that a relative rotation between both portions is possible if the torque limiting mechanism 39 is in a release state. The first toothed portion 48 is coupled to the operating portion 32 so as to be integrally rotatable therewith. As long as the teeth of both portions are engaged, a torque is transmitted via the toothed engagement. The first toothed portion 48 is held movable along the middle axis and is prebiased towards the second toothed portion 49 by means of one or more urging members 40 applying an urging force in a direction parallel with the middle axis. The torque limiting mechanism 39 is configured such that the first toothed portion 48 is normally engaged with the second toothed portion 49. The urging members 40 determine the force by which the first toothed portion and the second toothed portion are pressed against each other. Therefore, the one or more urging members as well as the teeth geometry of the toothed portions determine the maximum transferable torque. If a predetermined torque is exceeded, the toothed portions slip and are pushed away from each other against the urging force applied by the urging members 40 so that the teeth are disengaged and may pass each other without transferring any torque.

In addition or alternatively, the securing mechanism 34 may comprise a magnet 36. The magnet 36 may be provided in the center of the tightening member 30 in the coupling portion 31. The magnet 36 generates an attraction force towards the coupling section 91. For that, the coupling section 91 can comprise a portion made of metal. In particular, a portion of the force receiving portion 92 may be made from metal. The magnet 36 may be configured to provide an attraction force which is high enough for suitable holding the tightening member 30 on the coupling section 91 and the force receiving portion 92. Such an attraction force may not only be suitable for holding the tightening member 30 on the coupling section 91 but may also assist a user in finding the correct coupling position when the user approaches the tightening member 30 towards the force receiving portion 92. In other words, the magnet may be configured to attract the force receiving portion 92 into the coupling portion 11.

The tightening member 30 may further comprise a lower supporting surface 42 configured to be supported on the upper supporting surface 100 of the clamping device 90 in a sliding manner.

Figure 4:
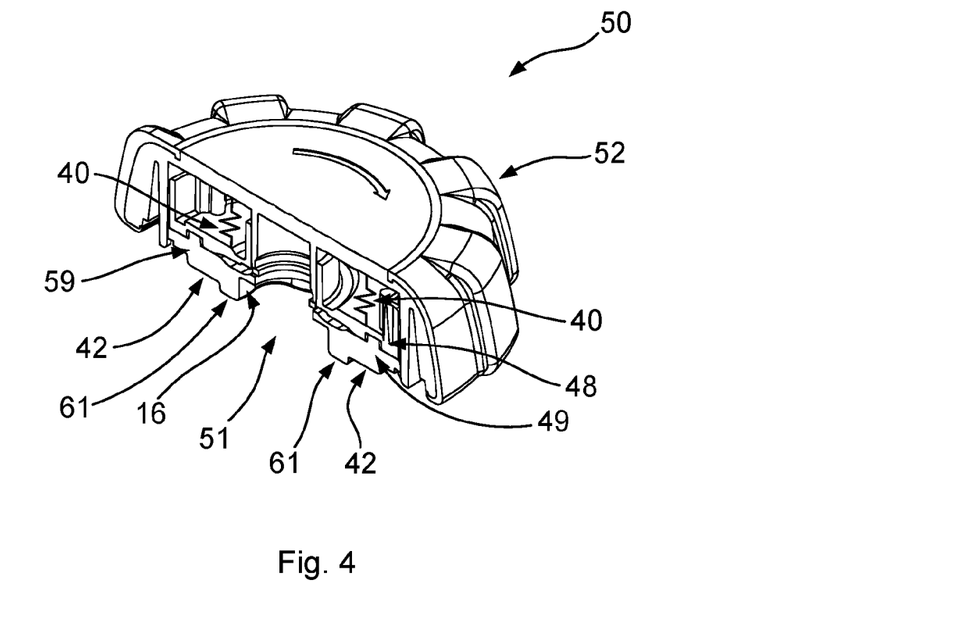
FIG. 4 shows a sectional perspective view of a tightening member according to another embodiment.

A tightening member 50 according to a third embodiment will be described with reference to FIG. 4. The tightening member 50 is similar to the tightening member 30 according to the second embodiment with the difference that the tightening member 50 does not comprise a securing mechanism 34. The tightening member 50 may thus be seen as a more simplified solution compared the tightening member 30 but comprising a torque limiting function. Same reference signs identify same or functionally similar elements. Again, the tightening member 50 comprises a coupling portion 51 corresponding to the above mentioned coupling portion 31. Furthermore, the tightening member 50 comprises the torque limiting mechanism 39 which corresponds to the torque limiting mechanism 59 described above. The operating portion 52 is operatively coupled to the coupling portion 51 via the torque limiting mechanism 59. The torque limiting mechanism 59 comprises a first toothed portion 48 operatively coupled to the operating portion 52 and a second toothed portion 49 operatively coupled to the coupling portion 51. As long as the teeth of both portions are engaged, a torque is transmitted via the toothed engagement. The function of the torque limiting mechanism 59 corresponds to the function of the above mentioned torque limiting mechanism 39.

Figure 6:
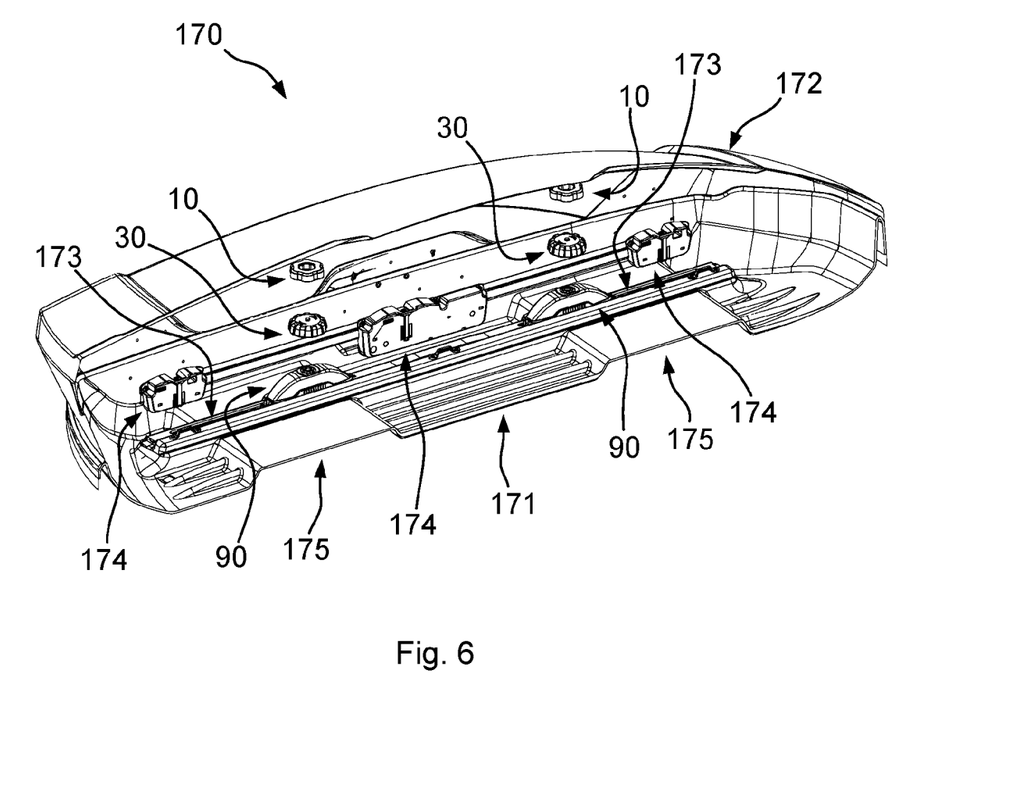
FIG. 6 shows a sectional perspective view of a roof box according to an embodiment, comprising clamping assemblies for mounting the roof box to a load carrier.
Figure 10:
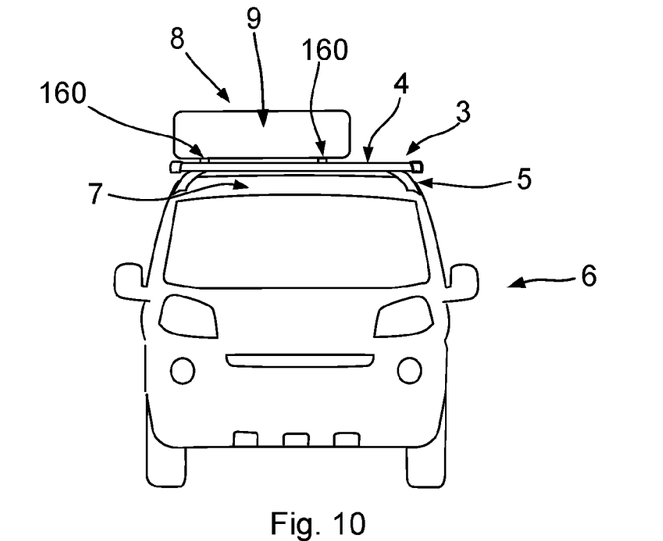
FIG. 10 shows a vehicle comprising a roof mounted load carrier supporting an accessory.
Figure 11:
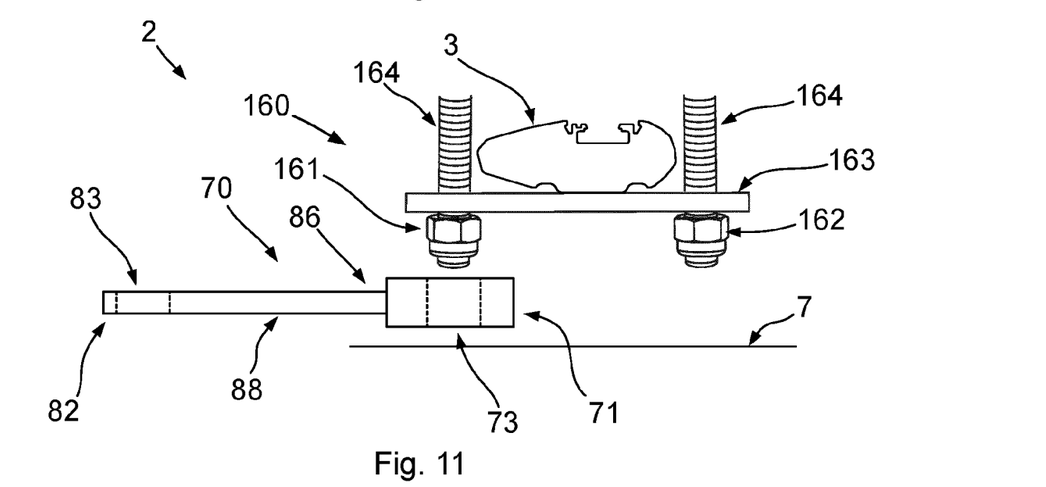
FIG. 11 shows a schematic view of a clamping assembly for mounting the accessory shown in FIG. 10.

FIG. 6 shows a roof box 170 which is fixable to a load carrier system by means of clamping devices as described before. The load carrier system may comprise a crossbar 4 and may be configured like the load carrier 3 as will be described later with reference to FIG. 10. The roof box 170 comprises a base 171 configured to support goods to be transported and an openable and closeable lid 172 hingedly coupled to the base 171 and lockable to the base 171 by means of locking devices 174. On its bottom portion, the base 171 comprises mounting sections 175 for accommodating a portion of the crossbar 4 therein. The base 171 comprises a trough shape. An opening in the form of a longitudinal slot 173 is provided on the bottom portion. The opening 173 is configured to partially receive the before mentioned clamping device 90, at least such that the clamping members 94 are passed through the opening 173 and protrude from an outer side of the bottom portion so as to be engageable with the crossbar 4. The lower support surface 101 of the clamping device 90 may be supported on an edge portion limiting the opening 173 on opposite lateral sides. The clamping device 90 may be slidable in longitudinal direction of the slot so as to allow a correct positioning of the same with respect to the crossbar 9.

Figure 7:
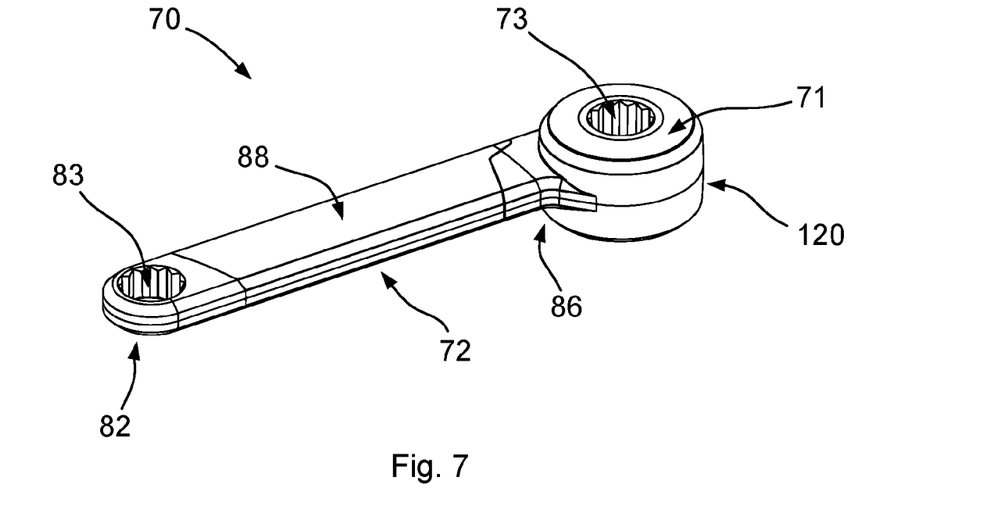
FIG. 7 shows a perspective view of a tightening member according to a further embodiment.

A tightening member 70 according to a fourth embodiment will now be described with reference to FIGS. 7 to 11. As shown in FIG. 7, the tightening member 70 comprises a coupling portion 71 and an operating portion 72. The coupling portion 71 and the operating portion 72 are operatively coupled. Accordingly, a movement of the operating portion 72 is transferred to the coupling portion 71. The operating portion 72 comprises a gripping handle 88 which may be grasped by a user. The operating portion 72 is coupled to the coupling portion at a first end portion thereof which may also be referred to as coupling section 86. On an opposite end portion of the operating portion 72, a torque limiting free coupling portion 82 may be provided. The torque limiting free coupling portion 82 comprises an opening 83 with an inner profile configured to be engaged with a force receiving section of a clamping device, for example with force receiving section 92 of the clamping device 90 as described before, or with a force receiving section 162 of a clamping device 160 that will be described later in greater detail with reference to FIG. 11. The torque limiting free coupling portion 82 is in particular useful for untightening a clamping device since a force applied may be transferred without any torque limitation. Therefore, a user may apply high forces on the force receiving sections for untightening the clamping members.

The coupling portion 71 comprises an accommodating portion 73 which in the shown embodiment is provided as a through opening. The accommodating portion 73 comprises an inner profile which allows to transfer a rotational force on a correspondingly shaped force receiving section. The force receiving section may be one of the before mentioned force receiving sections 92 and 162. The force receiving section may be a bolt head or a nut, for instance. In the embodiment, a torque limiting function and a ratchet function are combined in the tightening member 70 in order to increase the usability for a user. For that, a torque limiting mechanism 79 and a ratchet mechanism 78 are provided. The ratchet mechanism 78 allows a user to apply a tightening force on the coupling sections by means of a pumping action. The torque limiting mechanism 79 is provided to limit a torque transferable on a coupling section. According to the embodiment, the torque limiting mechanism 79 and the ratchet mechanism 78 are provided in this order in the force transfer path from the operating portion 72 to the accommodating portion 73. In this way, the ratchet mechanism 78 only transfers an already limited maximum torque to the accommodating portion 73, as received from and limited by the torque limiting mechanism 79.

Figure 8:
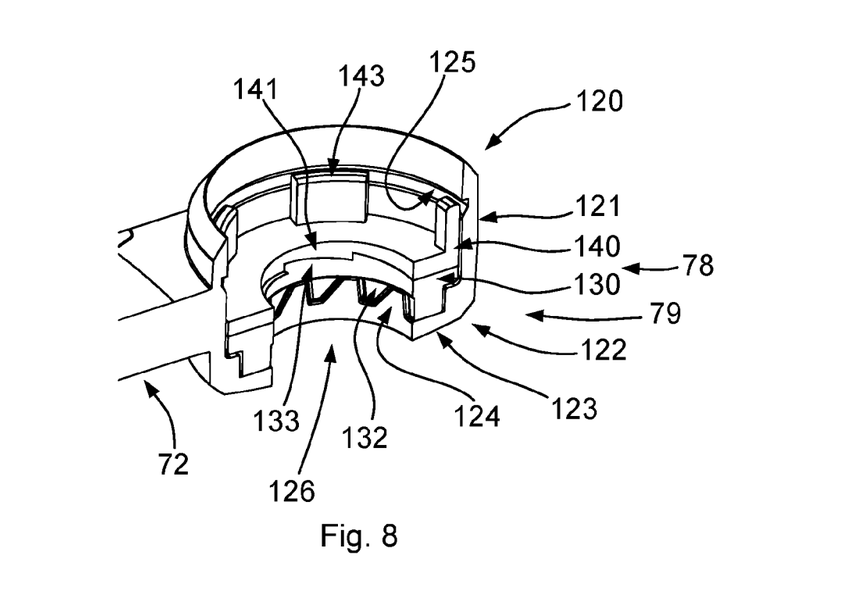
FIG. 8 shows a sectional perspective view of a coupling portion of the tightening member shown in FIG. 7.
Figure 9:
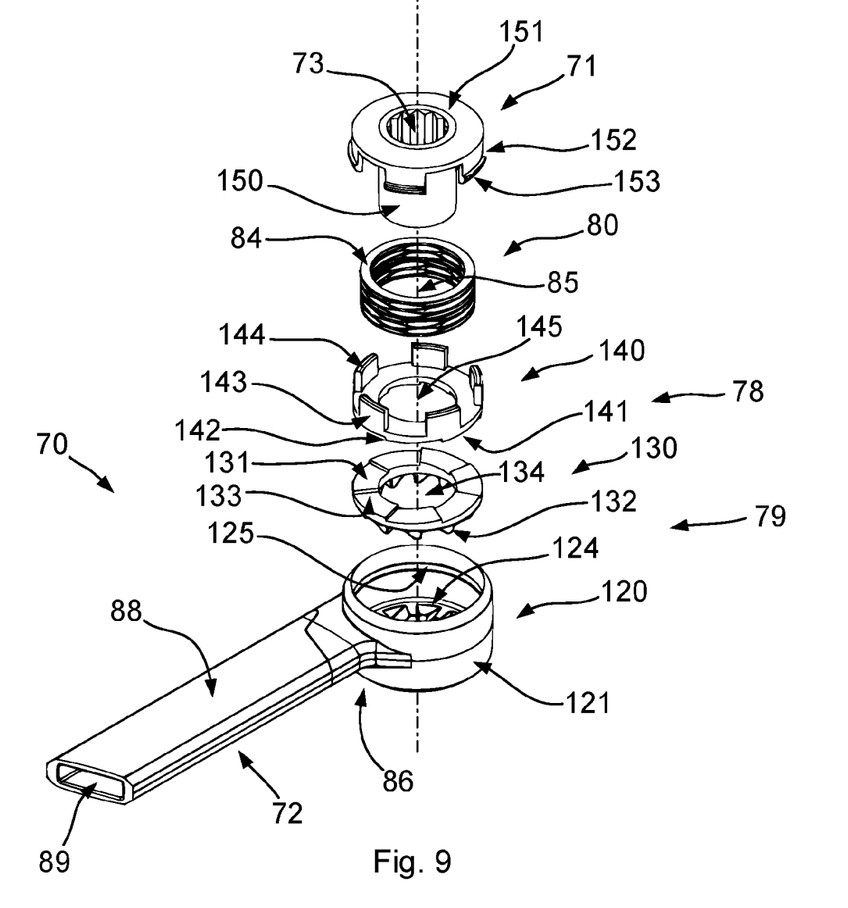
FIG. 9 shows a perspective exploded view of the tightening member shown in FIG. 7.

A possible configuration of the tightening member 70 is shown in FIGS. 8 and 9. The coupling section 86 may comprise a housing portion 120 which is integrally formed with the operating portion 72. The housing portion 120 comprises a cylindrical wall portion 121 and a bottom portion 122. The cylindrical wall portion 121 and the bottom portion 122 are integrally formed. The cylindrical wall portion 121 extends in a direction substantially perpendicular to a main extension direction of the gripping handle 88. The cylindrical wall portion 121 is a hollow cylindrical portion defining an interior space therein in which parts and members of the torque limiting mechanism 79 and the ratchet mechanism 78 are accommodated. The cylindrical wall portion 121 is an annular portion that extends about and along a middle axis C. The bottom portion 122 is provided at a lower axial end portion of the cylindrical wall portion 121 and is configured as flange 123 protruding or extending radially inwardly from the cylindrical wall portion 121. The bottom portion 122 comprises an outer wall portion facing away from an interior space defined by the cylindrical wall portion 121 and an inner wall portion facing towards and limiting the interior space defined by the cylindrical wall portion 121 in axial direction. On the inner wall portion, a first toothed portion 124 is provided. The first toothed portion 124 is provided for transmitting a rotational force about the middle axis C. Furthermore, an annular recess 125 is provided in the cylindrical wall portion 121 at an upper axial end portion of the cylindrical wall portion 121. The annular recess 125 is configured to rotatably receive the coupling portion 71 and to limit a movement of the coupling portion 71 in a direction along the middle axis C. In particular, the annular recess 125 is provided such that the coupling portion 71 may be engaged with the cylindrical wall portion 121 in a snap fit like manner. An opening 126 extending in axial direction is provided in the flange 123.

The opening 126 is configured to rotatably support a hollow cylindrical portion 150 of the coupling portion 71. Besides the hollow cylindrical portion 150, the coupling portion 71 comprises a flange portion 151 extending radially inwardly from an upper portion of the hollow cylindrical portion 150. The flange portion 151 defines an upper end of the coupling portion 71 and comprises at least a portion of the accommodating portion 73, more precisely an opening granting access to the interior space of the hollow cylindrical portion 150. On a radially outer edge portion of the flange portion 151, force receiving portions 152 are provided. The force receiving portions 152 are provided as protrusions extending from the flange portion 151 substantially in parallel with an outer surface of the hollow cylindrical portion 150. The force receiving portions 152 are arranged at a distance with respect to each other and may be arranged equidistantly along the outer edge portion of the flange portion 151. In this way, accommodating spaces for receiving force transfer portions 143 of a second force transfer member 140 are provided. Free end portions of the force receiving portions 152 comprise engaging portions 153 that are configured to be engaged with the annular recess 125. Radially outer surfaces of the force receiving portions 152 are configured to get in sliding contact with an inner surface of the cylindrical wall portion 121. Accordingly, a coupling portion 71 as described before is held rotatable about the middle axis C and axially immovable when correctly inserted into the housing portion 120. A surface of the flange portion 151 facing in opposite direction of the extension direction of the hollow cylindrical portion 150 may be configured as supporting surface that may be brought in sliding contact with a suitable support surface on a clamping device, for example an upper supporting surface 100 of the clamping device 90.

A first force transfer member 130 is provided in the cylindrical wall portion 121 adjacent to the bottom portion 122. The first force transfer member 130 is an annular member and may be configured in a disk like manner. The first force transfer member 130 comprises an annular base portion 131 comprising an outer diameter which is slightly smaller than the inner diameter of the cylindrical wall portion 121. Accordingly, the first force transfer member 130 is arranged such that a radially outer surface of the same is in sliding contact with the radially inner wall of the cylindrical wall portion 121. The base portion 131 comprises a central opening 134 having a diameter allowing to slidably receive the hollow cylindrical portion 150 of the coupling portion 71. The base portion 131 comprises a first portion facing towards the bottom portion 122 and a second portion facing in opposite direction. A second toothed portion 132 is provided on the first portion and a third toothed portion 133 is provided on the second portion. The second toothed portion 132 is configured matingly with the first toothed portion 124 provided in the housing portion 120. If the second toothed portion 132 is in engagement with the first toothed portion 124, a rotational force can be transferred from the housing portion to the first force transfer member 130. The first toothed portion 124 and the second toothed portion 132 form part of the torque limiting mechanism 79. The third toothed portion 133 is configured corresponding to a fourth toothed portion 142 provided on a force receiving portion 141 of a second force transfer member 140.

The second force transfer member 140 comprises an annular and disk like base member having a central opening 145 limited by an inner circumferential surface configured to get in sliding contact with an outer surface of the hollow cylindrical portion 150, and a radially outer surface configured to get in sliding contact with the inner surface of the cylindrical wall portion 121. The force receiving portion 141 is provided on an axial side of the second force transfer member 140, which faces the first force transfer member 130. On an opposite side of the second force transfer member 140, a force transfer portion 143 is provided and configured to be engaged with the coupling portion 71. The third toothed portion 133 and the fourth toothed portion 142 both form part of the ratchet mechanism 78. The third toothed portion and the fourth toothed portion are configured to provide a freewheel like configuration in which a rotational force may only be transferred in one direction.

The force transfer portion 143 comprises protrusions 144. The protrusions 144 extend in a direction substantially in parallel with the middle axis C and at a radial distance from the middle axis C at which the force receiving portions 152 of the coupling portion 71 are provided. In a mounted condition of the tightening member 70, the protrusions 144 extend into the spaces provided between the force receiving portions 152. Accordingly, a rotational force may be transferred through an engagement between the latter members. The protrusions 144 and the force receiving portions 152 partially overlap each other in axial direction. The protrusions 144 are axially movable with respect to the force receiving portions 152. An outer surface of the protrusions 144 is configured to be slidable on an inner surface of the cylindrical wall portion 121.

An urging member 80 is arranged between the coupling portion 71 and the second force transfer member 140 such that the second force transfer member 140 is urged away from the flange portion 151 along the middle axis C. The urging member 80 may comprise a spring 84, for example a wave spring and/or one or more disk springs stacked upon each other. The urging member 80 comprises an opening 85 through which the hollow cylindrical portion 150 of the coupling portion 71 extends in a mounted condition of the tightening member 70. With this configuration, the second force transfer member 140 is pushed on the first force transfer member 130 which is in turn pushed against the engaging portion 123 of the housing portion 120. The combination of a predefined urging force exerted by the urging member 80 with specific shapes of the toothed portions results in a mechanism in which a ratchet mechanism 78 and a torque limiting mechanism 79 are combined leading to a space-saving and enhanced tightening member. The configuration is particular space-saving since parts 130, 140 forming the ratchet mechanism and the torque limiting mechanism are configured as members arranged upon each other in axial direction and engaging with each other in axial direction. In this way, the dimension in axial direction of the accommodating portion 73 can be reduced. The force transfer members 130, 140, the urging member 80 and at least sections of the coupling portion 71, preferably the entire coupling portion 71, are accommodated in the housing portion 120. The housing may comprise a dimension in axial direction of the middle axis C which is at most three times of the dimension of the gripping handle in this direction.

Although a ratchet mechanism is only described in connection with the fourth embodiment, it is noted that such a ratchet mechanism may also be applied in the other embodiments of tightening members in a similar way.

Although not shown in the embodiments, it is possible to provide a locking mechanism for suppressing or bypassing the torque limiting function and/or the ratchet function. In this way, the tightening members may be configured to be also used for untightening purposes that need higher torques, so that a torque-limiting-free coupling portion 82 as mentioned above could be omitted.

In some embodiments of the tightening members 10, 30 and 50, the parts and members of the different portions and mechanisms are substantially fully accommodated within the operating portions 12, 32 and 52. In some embodiments, the coupling portion does in axial direction not protrude from the operating portions or knob more than 20 percent of the dimension of the operating portion in this direction.

According to a modification, a torque-limiting-free coupling portion may in axial direction be provided on one side of the operating portion and a torque-limiting coupling portion may be provided on the opposite side, so that coupling portions are provided on opposite sides of the tightening member. For example, a torque-limiting-free coupling portion may be provided in an upper portion or surface of the tightening member 50.

Furthermore, according to a modification, the coupling portion may comprise a protrusion instead of an accommodating portion, recess or opening, and the force receiving portion of the clamping device may comprise an accommodating portion, recess or opening instead of a protruding portion accommodatable in the tightening member. In such an inverse arrangement, other features like the torque limiting mechanism, ratchet mechanism and/or securing mechanism may be provided and suitably combined in the manners described above.

Figure 12:
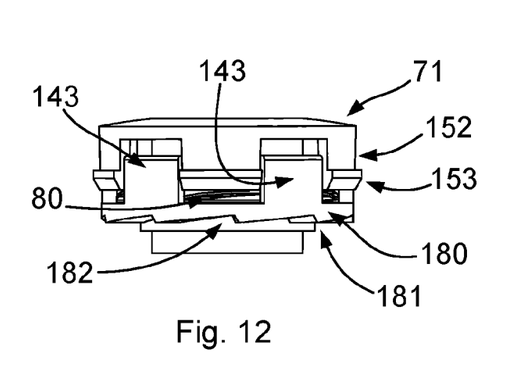
FIG. 12 shows a side view of elements of a coupling portion according to a modification.

According to a modification, the ratchet mechanism and the torque limiting mechanism may be integrally combined by use of a specific force transfer member 180 as shown in FIG. 12. Force transfer member 180 is configured similar to the above described second force transfer member 140. Force transfer member 180 also comprises the force transfer portion 143 which is provided and configured to be engaged with the coupling portion 71. It differs, however, in that its force receiving portion 181 differs from the force receiving portion 141. More precisely, the force receiving portions 141, 181 differ in their toothed portions.

In the configuration as shown in FIG. 9, the ratchet mechanism 78 is provided by a pair of toothed portions, namely the third toothed portion 133 and the fourth toothed portion 142. These toothed portions 133, 142 each comprise teeth. Each tooth comprises a first tooth flank that extends in radial direction from the middle axis C and in a direction substantially parallel to the middle axis C. Each tooth comprises a second tooth flank that extends in radial direction and about the middle axis C at an angle with respect to the first tooth flank. With this configuration, a rotational force about the middle axis C may be transferred via the tooth flanks which extend in parallel to the extension direction of the middle axis C when moving the operating portion 72 in tightening direction. On the other hand, the other tooth flanks are only slightly inclined with respect to a plane extending perpendicular to the middle axis C so that a rotation of the operating portion 72 in opposite direction leads to a sliding movement between the tooth flanks. A sliding movement of one of the toothed portions relative to the other one urges the toothed portions away from each other. A grip between the toothed portions is thus lost leading to a relative movement of the toothed portions.

The torque limiting mechanism 79 is provided by an interaction between the first toothed portion 124 and the second toothed portion 132. The first toothed portion 124 comprises teeth extending along the middle axis C and each having an angled surface. The second toothed portion 132 also comprises teeth extending along the middle axis C and each having an angled surface. The teeth of the first toothed portion 124 are adapted to interact with the teeth on the second toothed portion 132 so as to transfer torque imparted by a user therebetween. The second toothed portion 132 and the first toothed portion are biased against each other by means of the urging member 80. If a predetermined threshold value of torque is reached, the teeth will start to slip and eventually loose grip with each other. As the grip is lost, the first toothed portion 124 will rotate relative to the second toothed portion 132. A torque transfer exceeding the threshold torque is thus prevented. The threshold torque may be set depending on the strength of the urging member and/or the angle/inclination of tooth flanks contacting each other for torque transfer.

The embodiment as shown in FIGS. 7 to 9 comprises two separate toothed portions embodied as discs for ratchet and torque function and, hence, an additional member compared to the modification. The engagements between the toothed portions are configured such that the ratchet mechanism transfers full torque in tightening direction and allows relative movement between the toothed portions in opposite direction. The torque limiting mechanism is configured to transfer a predetermined threshold torque in tightening direction. In opposite direction, the torque limiting mechanism transfers a torque which is higher than the torque transferable in the ratchet mechanism.

According to the modification as shown in FIG. 12, the force receiving portion 181 comprises a dual-action toothed portion 182, for providing both ratchet and torque limiting function. Teeth provided on the toothed portion 182 comprise different angles and/or slopes with respect to a plane extending parallel with middle axis C. None of the tooth flanks extends in a plane extending along the middle axis C. The teeth may thus act in both tightening and in opposite rotational direction and may comprises different slopes or inclinations for different functions, for example torque limiting in one rotational direction and ratchet in the opposite rotational direction. Such configuration allows the teeth to slip on each other if a predetermined threshold torque is exceeded. In tightening direction, the threshold torque is considerably higher than in the opposite rotational direction.

Figure 13:
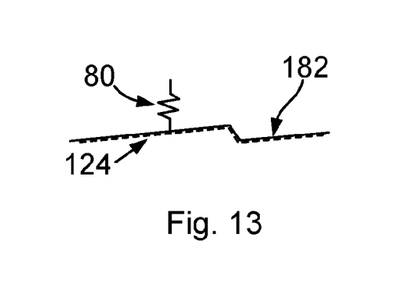
FIGS. 13 to 15 show schematic illustrations of the working principle of the modification according to FIG. 12.
Figure 14:
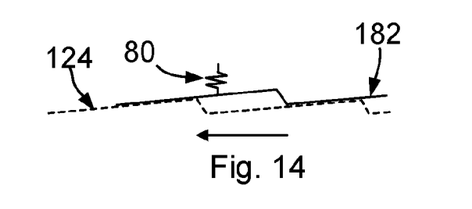
Figure 15:
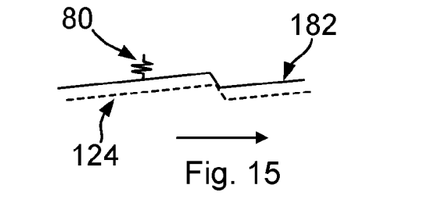

FIG. 13 shows a state in which the first toothed portion 124 is in engagement with the toothed portion 182. The force transfer member 180 is biased against the flange 123 so that both toothed portions are normally engaged. FIG. 14 shows a state in which a torque exceeding a ratchet threshold value is applied in untightening direction. The first toothed portion 124 already moved relative to the toothed portion 182 as indicated by the arrow. Due to the small inclination between the cooperating tooth flanks, the toothed portion 182 is translated against the urging force of the urging member 80 under application of a relatively small rotational force by a user. FIG. 15 shows a state in which a torque exceeding a tightening torque threshold value is applied in tightening direction as indicated by the arrow. The first toothed portion 124 already moved relative to the toothed portion 182. Due to the steeper inclination between the cooperating tooth flanks, higher torque is necessary for creating slipping between the tooth flanks.

The inclination of both tooth flanks of each teeth and the spring force need to be tuned to obtain the right amount of tightening torque limit and ratchet function. Combining both ratchet and torque limiting function within a single member further reduces the size of the tightening member in a direction of the middle axis C.

The invention claimed is:

1. A tightening member for tightening a clamping device for fixing an accessory to a crossbar, said tightening member comprising:
    a coupling portion for detachably coupling said tightening member to a force receiving section of said clamping device, said coupling portion engageable with said force receiving section in a torque transferable manner;
    an operating portion configured to be grasped and rotated by a user, said operating portion being operatively coupled to said coupling portion;
    a torque limiting mechanism operatively coupling said coupling portion with said operating portion; and
    a ratchet mechanism configured to allow a pumping-like tightening operation by providing a one way torque transmission,
    wherein said coupling portion comprises an accommodating portion for at least partially receiving a force receiving section therein.

2. The tightening member according to claim 1, said torque limiting mechanism comprising:
    a first toothed portion operatively coupled to said operating portion;
    a second toothed portion operatively coupled to said coupling portion; and
    an urging member for urging said first toothed portion and said second toothed portion towards each other with a predetermined urging force, said predetermined urging force and a configuration of said first and second toothed portions defining a maximum transferable torque.

3. The tightening member according to claim 2, said ratchet mechanism comprising:
    a third toothed portion operatively coupled to said operating portion;
    a fourth toothed portion operatively coupled to said coupling portion; and
    an urging member for urging said third toothed portion and said fourth toothed portion towards each other,
    wherein said third and fourth toothed portions comprise a tooth configuration such that in one direction, teeth of a driving toothed portion lock with teeth of a driven toothed portion, and in another direction, teeth of said driving toothed portion slip over teeth of said driven toothed portion.

4. The tightening member according to claim 3,
wherein said torque limiting mechanism and said ratchet mechanism are provided in this order in a force transfer path from said operating portion to said coupling portion, or wherein said torque limiting mechanism and said ratchet mechanism are provided by a single pair of toothed portions each toothed portion of said pair of toothed portions comprising dual-action teeth configured to transfer torque up to a predetermined first threshold limit in a tightening direction and allowing slipping between the toothed portions in an opposite rotating direction, and/or wherein at least one toothed portion is provided on a disc member prebiased towards engagement with the other toothed portion, and/or wherein said torque limiting mechanism and said ratchet mechanism are fully accommodated in a common cylindrical housing portion, and/or wherein a toothed portion of said torque limiting mechanism and/or of said ratchet mechanism, which is last in said force transfer path between said operating portion and said coupling portion, is provided on a force transfer member having, on an opposite side to a side on which said toothed portion is provided, a force transfer portion engaged with said coupling portion such that a rotational force is transferable to said coupling portion while said force transfer member is held axially movable relative to said coupling portion.

5. The tightening member according to claim 1, further comprising a torque-limiting-free coupling portion.

6. The tightening member according to claim 1, wherein said accommodating portion comprises a through opening extending through the entire coupling portion and comprising an inner profile which allows a transfer of a rotational force on a correspondingly shaped force receiving section.

7. The tightening member according to claim 1, wherein a single urging member acts in both said torque limiting mechanism and said ratchet mechanism.

8. The tightening member according to claim 1, wherein the torque limiting mechanism and the ratchet mechanism are engageable along an axial direction in relation to a middle axis.

9. The tightening member according to claim 1, wherein a first force transfer member and a second force transfer member of the tightening member are arranged upon each other in an axial direction in relation to a middle axis and engage with each other in the axial direction.

* * * * *

UNITED STATES PATENT AND TRADEMARK OFFICE
CERTIFICATE OF CORRECTION

PATENT NO. : 12,365,290 B2  
APPLICATION NO. : 18/563343  
DATED : July 22, 2025  
INVENTOR(S) : Nilvius et al.

Page 1 of 1

It is certified that error appears in the above-identified patent and that said Letters Patent is hereby corrected as shown below:

In the Claims

In Column 19, Claim 4, Line 7, delete "portions" and insert --portions,-- therefor.

Signed and Sealed this  
Twenty-third Day of September, 2025

John A. Squires  
*Director of the United States Patent and Trademark Office*